UNITED STATES PATENT OFFICE.

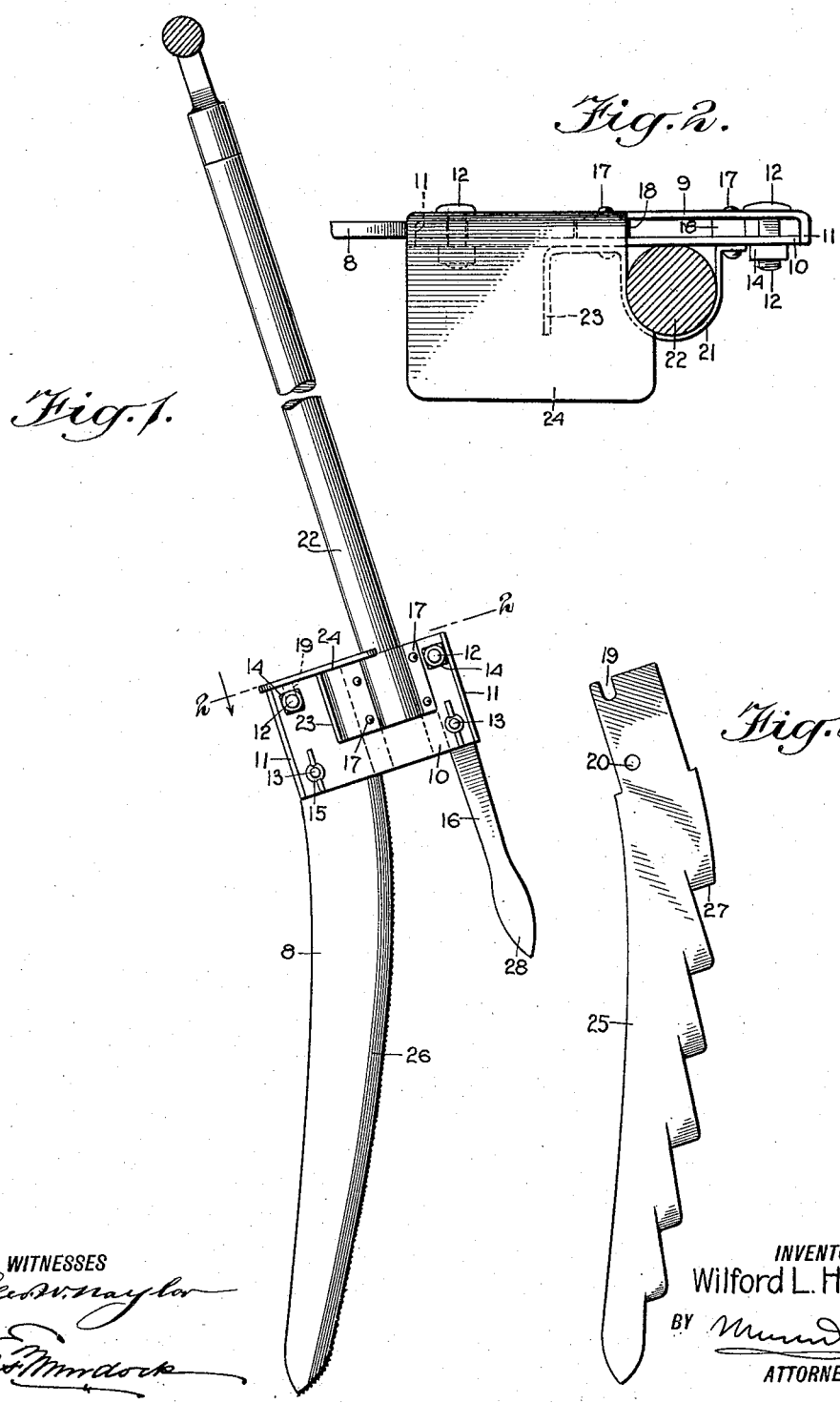

WILFORD LAFAYETTE HURST, OF ASPEN, COLORADO.

STACK-CUTTING IMPLEMENT.

1,161,682. Specification of Letters Patent. Patented Nov. 23, 1915.

Application filed March 16, 1915. Serial No. 14,856.

*To all whom it may concern:*

Be it known that I, WILFORD L. HURST, a citizen of the United States, and a resident of Aspen, in the county of Pitkin and State of Colorado, have invented a new and Improved Stack-Cutting Implement, of which the following is a full, clear, and exact description.

Among the principal objects which the present invention has in view are: to provide a cutting implement for dividing a relatively large stack into relatively small packages; to permit the operator to perform the operation while in a standing or upright position; and to provide an implement of the character mentioned with a series of cutting members designed to accommodate the various uses for which said implement is employed.

*Drawings.*—Figure 1 is a side view of an implement of the character mentioned constructed and arranged in accordance with the present invention; Fig. 2 is a sectional view on an enlarged scale, the section being taken as on the line 2—2 in Fig. 1; Fig. 3 is a side view of a modified form of a cutter employed in conjunction with the herein-described implement.

*Description.*—As seen in the drawings, the blade 8 is machete-shaped, and in service is rigidly held in a frame embodying clamping plates 9 and 10. The plate 9 is provided with perpendicular flanges 11. The flanges 11 form guides for the plate 10. The plate 10 is held in service position by bolts 12 and 13, the former being engaged by wrench-nuts 14, and the latter by wing-nuts 15, as shown best in Fig. 1 of the drawings. The plate 10 is preferably constructed of material having sufficient resiliency to be drawn into engagement with the blade 8 and a spike 16 when the same are in position and when the nuts 14 and 15 are manipulated to that end. Said blades are permanently united by bolt rivets 17. The rivets 17 pass through spacing blocks 18, which blocks operate to prevent the collapsing of the plates 9 and 10, as well as to form channel guides for the blade 8 and the spike 16. The blade and spike mentioned are furnished at the upper ends thereof with recesses 19, after passing around to enfold the bolts 12. In suitably spaced relation to the inner ends of the recesses 19, the blade 8 and spike 16 have perforations, such as indicated in Fig. 3 of the drawings by the numeral 20. When disposing said blade or spike in service position, or when removing the same from service position, the bolts 13 are withdrawn and subsequently replaced to extend through the perforations 20. Said blade and spike are held by said bolts 13 from falling out of position between the plates 9 and 10. When disposed in service position, the nuts 14 and 15 are manipulated to spring the edges of the plates 9 and 10 to clamp the same firmly on the sides of the blades and spikes.

Secured rigidly by the rivets 17 on the plate 10 and in service relation to the plate 9 is a socket plate 21. The plate 21 is bent to form, in conjunction with the plate 10, an open-ended socket to hold in service a handle 22. The socket plate 21 is arranged so that the axis of the socket formed thereby is parallel with the axis of the spike 16. The length of the handle 22 is formed in accordance with the design of the manufacturer and to suit the operator. The plate 21 is further bent to form a bracket flange 23, which extends outward from the plate 10 to form a support for a foot-rest 24. The foot-rest 24 is rigidly connected with or integrally formed with the plate 9, to extend in perpendicular relation thereto, and preferably in line with the blade 8.

It will be understood that the design of the cutters employed in conjunction with this implement may be varied to suit the different uses for which the implement is employed. Thus, in Fig. 3 of the drawings, a modified form of blade 25 is shown, where, instead of the relatively simple sickle edge 26 of the blade 8, there is substituted a series of chisel-like projections 27. The projections 27, as indicated in the drawings, are sharpened to form a cutting edge addressed to substantially the direction of thrust of In operating with an implement constructed and arranged as disclosed, the blade 8 or 25 is thrust from above into the hay, alfalfa, or other material forming a the blade 25.
stack, the operator at the time standing on the stack. The blade or cutter being shaped in the manner above described, the point thereof is set back from the head 28 of the spike 16. It will be understood that should a straight blade be employed, provision must be made to obtain the same offset or triangular relation of the blade to the spike as disclosed. When the head 28 of the spike enters the material forming the stack, it does so in a path inclined to the path of the cutting edge of the blade 8. The inner edge of the spike thereafter, when said spike and blade are further depressed, forms a wedging edge which draws the blade 8 forward and forces the cutting edge thereof against the material in which it is embedded, in a manner to produce a shearing cut. When the implement is fully inserted in the material forming the stack, in the operation of which the attendant presses his foot upon the rest 24, the blade and implement to which it is attached will be found to have been advanced in the line of cut. The full insertion having been made, the implement is lifted until the spike head 28 is cleared, when, pressing the implement forward, the spike 16 is again inserted into the material, the head 28 thereof entering at a point advancing the width of the former cut beyond where said head was previously inserted. The same effect on the blade 8 is again produced by the inclined position of the spike 16. Repeated operations such as set forth finally result in forming a cut through the stack or material being operated upon. It will be observed that during the performance of the operation the operator has maintained a relatively comfortable and upright working posture.

Claims:

1. An implement as characterized comprising a holding frame; a pointed guiding tool mounted therein; and a cutting blade disposed in flared relation to said guiding tool, the cutting edge of said blade being disposed in adjacent relation to said guiding tool.

2. An implement as characterized comprising a holding frame; a pointed guiding tool mounted therein; a cutting blade disposed in flared relation to said guiding tool, the cutting edge of said blade being disposed in adjacent relation to said guiding tool; and a handle extending above said frame for manipulating said implement.

3. An implement as characterized comprising a holding frame; a pointed guiding tool mounted therein; a cutting blade disposed in flared relation to said guiding tool, the cutting edge of said blade being disposed in adjacent relation to said guiding tool; a handle extending above said frame for manipulating said implement; and a foot-rest mounted upon said frame to bear the weight of the operator when forcing said tool and blade into the material being cut.

4. An implement as characterized comprising a holding frame; a pointed guiding tool mounted therein; a cutting blade disposed in flared relation to said guiding tool, the cutting edge of said blade being disposed in adjacent relation to said guiding tool; an operating handle mounted on said frame in line with said tool; and a foot-rest disposed on said frame in perpendicular relation to the axis of said tool.

In testimony whereof I have signed my name to this specification in the presence of two subscribing witnesses.

WILFORD LAFAYETTE HURST.

Witnesses:
AMOS BOURQUEIR,
S. H. FINLEY.

Copies of this patent may be obtained for five cents each, by addressing the "Commissioner of Patents, Washington, D. C."